United States Patent
Aldrey et al.

(10) Patent No.: US 9,215,511 B2
(45) Date of Patent: Dec. 15, 2015

(54) METHODS AND SYSTEMS FOR DYNAMICALLY ADJUSTING AT LEAST ONE OF A START AND A STOP OF A RECORDING BASED ON AN ADVERTISEMENT BREAK

(75) Inventors: Raul I. Aldrey, Plano, TX (US); Venkata S. Adimatyam, Irving, TX (US); Sameer Gavade, Irving, TX (US); Muthukumar X. Kasitholkappian, Chennai (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 121 days.

(21) Appl. No.: 12/939,791

(22) Filed: Nov. 4, 2010

(65) Prior Publication Data

US 2012/0114306 A1 May 10, 2012

(51) Int. Cl.
- *H04N 9/80* (2006.01)
- *H04N 21/81* (2011.01)
- *H04N 5/782* (2006.01)
- *H04N 21/433* (2011.01)
- *H04N 21/472* (2011.01)

(52) U.S. Cl.
CPC ............ *H04N 21/812* (2013.01); *H04N 5/782* (2013.01); *H04N 21/4334* (2013.01); *H04N 21/47214* (2013.01)

(58) Field of Classification Search
None
See application file for complete search history.

(56) References Cited

U.S. PATENT DOCUMENTS

| | | | | |
|---|---|---|---|---|
| 5,864,823 A * | 1/1999 | Levitan | ...................... | 705/14.61 |
| 2002/0054068 A1 * | 5/2002 | Ellis et al. | ...................... | 345/716 |
| 2003/0117530 A1 * | 6/2003 | McGee | ................ | H04N 5/44 348/700 |
| 2004/0010807 A1 * | 1/2004 | Urdang et al. | ................ | 725/136 |
| 2004/0202453 A1 * | 10/2004 | Iggulden | ......................... | 386/83 |
| 2005/0149968 A1 * | 7/2005 | Konig et al. | .................... | 725/32 |
| 2006/0168625 A1 * | 7/2006 | Gildred | ............................ | 725/58 |
| 2007/0280635 A1 * | 12/2007 | Huang et al. | .................... | 386/83 |
| 2008/0219643 A1 * | 9/2008 | Le Buhan | ................ | H04N 5/76 386/291 |
| 2011/0087490 A1 * | 4/2011 | Olson | .......................... | 704/231 |

* cited by examiner

*Primary Examiner* — Hung Dang
*Assistant Examiner* — Sunghyoun Park

(57) ABSTRACT

Methods and systems for dynamically adjusting a start or a stop of a recording based on an advertisement break are disclosed herein. An exemplary method includes a media content access subsystem detecting an instruction configured to trigger a start or a stop of a recording of a media content instance at a start time or a stop time based on a clock reference, detecting an advertisement break proximate in time to the start time or the stop time, and adjusting the start or the stop of the recording based on the advertisement break. Corresponding methods and systems are also disclosed.

20 Claims, 9 Drawing Sheets

METHODS AND SYSTEMS FOR DYNAMICALLY ADJUSTING AT LEAST ONE OF A START AND A STOP OF A RECORDING BASED ON AN ADVERTISEMENT BREAK

BACKGROUND INFORMATION

Set-top box devices and other media content access devices are often configured to provide users with access to a large number and variety of media content choices. For example, a user may choose to experience a variety of broadcast television programs, pay-per-view services, video-on-demand programming, Internet services, and audio programming via a set-top box device. Certain media content access devices include a digital video recording ("DVR") application. In general, media content access devices with DVR applications (i.e. "DVR devices") allow a user to record and then view or otherwise experience recorded media content. For example, a user may use a DVR device to schedule a recording of a particular television program, after which the DVR device may record the television program and allow the user to play back a presentation of the recorded television program in a time-shifted manner.

However, when starting and stopping recording operations based on a schedule of recordings, conventional DVR devices rely on rigid start times and stop times that fail to take into account the possibility that a particular television program may begin early and/or end late. As a result, DVR devices often "cut off" the beginning and/or ending of television programs that are recorded. Because the beginning and/or ending of a television program may contain information that is necessary to properly understand a plot, a storyline, and/or a resolution of the television program, viewing a recorded television program with the beginning and/or ending cut off can be frustrating and unfulfilling for a user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
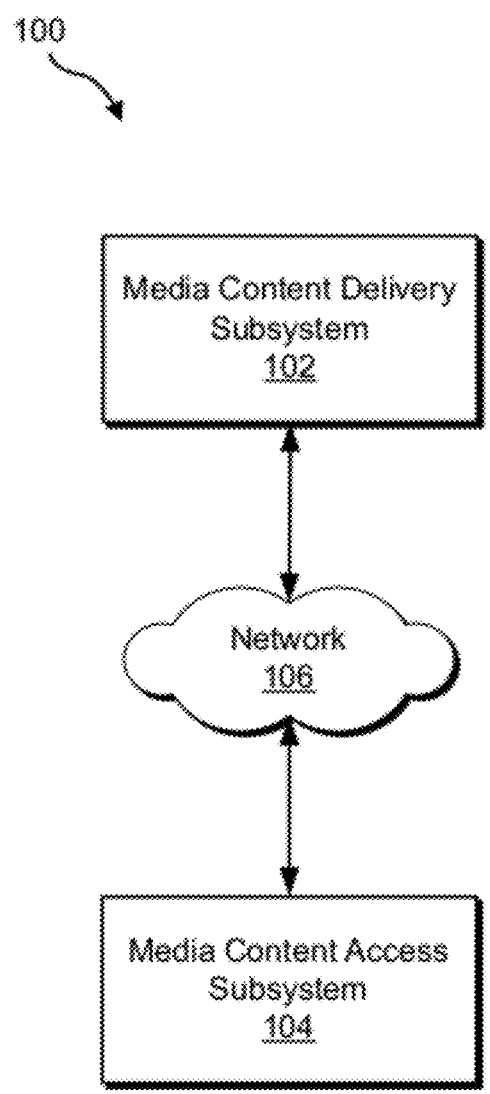
FIG. 1 illustrates an exemplary media content delivery system according to principles described herein.

Methods and systems for dynamically adjusting a start and/or a stop of a recording based on an advertisement break are described herein. As described in more detail below, a media content access subsystem may be configured to detect data representative of one or more instructions configured to trigger a start and/or a stop of a recording of a media content instance at a start time and/or a stop time based on a clock reference. The media content access subsystem may be further configured to detect an advertisement break proximate in time to the start time or the stop time and adjust the start or the stop of the recording based on the advertisement break.

The methods and systems described herein may be configured to preserve the beginning and/or the ending of a media content instance being recorded even if the media content instance begins earlier than expected and/or ends later than expected. To illustrate, a user who is unable to watch a live transmission of her favorite television program may utilize a digital video recorder ("DVR") device to schedule a recording of the television program. For example, the DVR device may schedule the recording to start at a particular start time (e.g., 9:00 pm) associated with the scheduled beginning of the television program (e.g., a time identified by a program guide as being associated with the beginning of the television program) and to stop at a particular stop time (e.g., 10:00 pm) associated with a scheduled ending of the television program (e.g., a time identified by a program guide as being associated with the ending of the television program or the beginning of a subsequent television program). However, if the actual beginning and/or ending of the television program differs from the scheduled start time and/or stop time, the resulting recording may not include all of the user's favorite television program. For example, if the television program runs longer than scheduled or expected, the resulting recording may not capture the ending of the television program. Similarly, if the television program begins earlier than scheduled or expected, the resulting recording may not capture the beginning of the television program. Accordingly, when the user attempts to play back the recording, she will discover that the recording is incomplete and she will be unable to view all of her favorite television program. The methods and systems described herein may remedy this problem by dynamically adjusting when a recording starts and/or stops to correspond with a television program beginning early and/or ending late, thereby preserving the entire television program (e.g., capturing the entire television program in the recording) for the enjoyment of the user.

Additionally or alternatively, in situations where a television program begins late and/or ends early, the methods and systems described herein may dynamically adjust the start and/or stop of a corresponding recording in order to prevent the capture of media content transmitted before and/or after the transmission of the television program being recorded. For example, if the television program begins late, the start of the recording may be delayed in order to avoid capturing any preceding media content (e.g., advertisements being transmitted prior to the beginning of the television program). Accordingly, when the user goes to play back the recording, she will not need to view or fast forward through unrelated media content that was transmitted prior to the beginning of the television program. These and other benefits of the exemplary systems and methods described herein will be explained in more detail below.

As used herein, the term "media content" may refer generally to any content made accessible by a media content delivery subsystem to a media content access subsystem. The term "media content instance" will be used herein to refer to any television program, on-demand media program, pay-per-view media program, broadcast media program (e.g., broadcast television program), multicast media program, narrowcast media program, IPTV content, video, movie, song, or any segment, component, or combination of these or other forms of media content that may be viewed or otherwise experienced by a user.

FIG. 1 illustrates an exemplary media content delivery system 100 (or simply "system 100"). System 100 may include a media content delivery subsystem 102 (or simply "delivery subsystem 102") and a media content access subsystem 104 (or simply "access subsystem 104") in communication with one another via a network 106. Access subsystem 104 may be configured to communicate with and receive a media content stream from delivery subsystem 102.

Delivery subsystem 102 and access subsystem 104 may communicate using any suitable communication technologies, devices, networks, media, and protocols supportive of remote data communications. For example, delivery subsystem 102 and access subsystem 104 may communicate over network 106 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 106 may include one or more networks or types of networks (and communication links thereto) capable of carrying communications, media content, and/or data signals between delivery subsystem 102 and access subsystem 104. For example, network 106 may include, but is not limited to, one or more wireless networks (e.g., satellite media broadcasting networks or terrestrial broadcasting networks), mobile telephone networks (e.g., cellular telephone networks and/or mobile telephone data networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between delivery subsystem 102 and access subsystem 104. Communications between delivery subsystem 102 and access subsystem 104 may be transported using any one of above-listed networks, or any combination or sub-combination of the above-listed networks.

While an exemplary system 100 is shown in FIG. 1, the exemplary components illustrated in FIG. 1 are not intended to be limiting. Other hardware environments and implementations may be used in other examples. Exemplary components of system 100 will now be described in additional detail.

Figure 2:
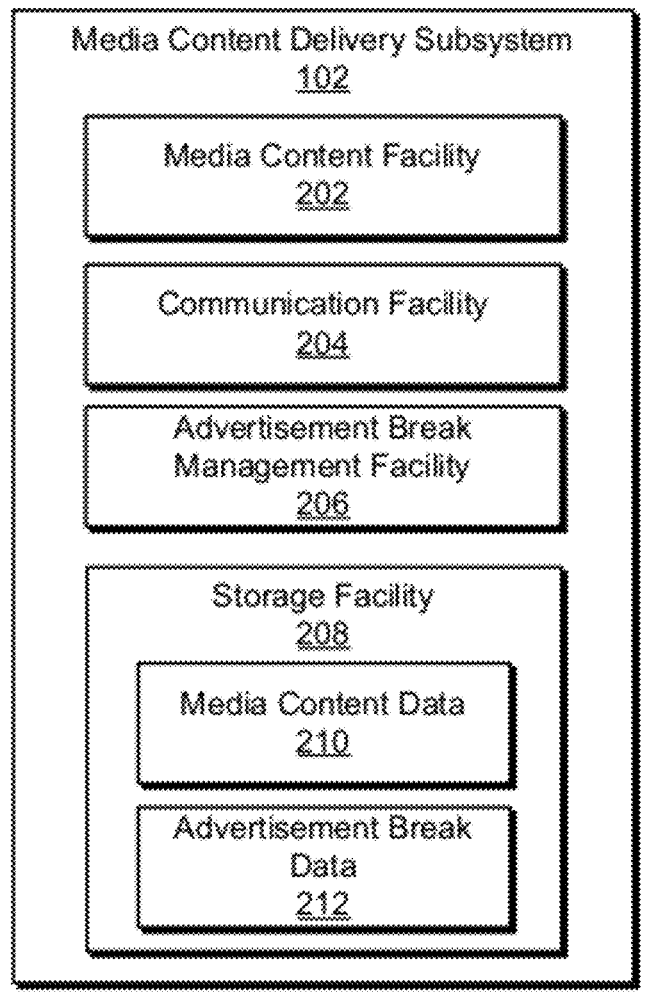
FIG. 2 illustrates exemplary components of a media content delivery subsystem according to principles described herein.

FIG. 2 illustrates exemplary components of delivery subsystem 102. As shown in FIG. 2, delivery subsystem 102 may include a media content facility 202, a communication facility 204, an advertisement break management facility 206, and a storage facility 208, which may be in communication with one another using any suitable communication technologies. It will be recognized that although facilities 202-208 are shown to be separate facilities in FIG. 2, any of those facilities may be combined into a single facility as may serve a particular implementation.

Media content facility 202 may be configured to manage (e.g., maintain, generate, process, and/or transmit) media content configured to be presented to one or more users of access subsystem 104. For example, media content facility 202 may be configured to maintain and transmit data representative of a media content instance in the form of a media content stream to access subsystem 104.

Communication facility 204 may be configured to facilitate communication between delivery subsystem 102 and access subsystem 104. In particular, communication facility 204 may be configured to transmit and/or receive communication signals, media content streams, metadata and/or any other data to/from access subsystem 104. For example, communication facility 204 may transmit (e.g., broadcast, multicast, and/or narrowcast) data representative of one or more media content instances to access subsystem 104. Such data may be transmitted in one or more media content streams or in any other suitable manner as may serve a particular implementation. Communication facility 204 may be configured to interface with any suitable communication media, protocols, and formats, including any of those mentioned above.

Advertisement break management facility 206 may be configured to manage a placement of one or more advertisement breaks included in a media content stream provided to access subsystem 104. One or more advertisements may be presented to a user during each of the advertisement breaks. In some examples, one or more of the advertisements are included in the media content stream provided by media content facility 202. Additionally or alternatively, one or more of the advertisement breaks may be designated by advertisement break management facility 206 as being reserved for presentation of one or more advertisements provided by a third party. For example, a designated advertisement break in a media content stream may be configured to direct access subsystem 104 to tune away from the media content stream to one or more advertisement streams carried by way of one or more corresponding advertisement channels during the designated advertisement breaks in order to present one or more advertisements (e.g., targeted advertisements, local advertisements, etc.) to one or more users of access subsystem 104.

Advertisement break management facility 206 may be configured to insert a message (e.g., an in-band message) indicative of an upcoming advertisement break in the media content stream provided by media content facility 202. Accordingly, as will be described in more detail below, access subsystem 104 may detect the message in an incoming media content stream and adjust a start and/or a stop of a recording of a media content instance within the media content stream based on the advertisement break. The message may additionally or alternatively be indicative of when the advertisement break will begin and/or end, a duration of the advertisement break, a type of the advertisement break, and/or any other information associated with the advertisement break as may serve a particular implementation. In some examples, the message may include a cue message (or "cue tone") configured in accordance with standards of The Society of Cable and Telecommunications Engineers ("SCTE"). For example, the cue message may be configured in accordance with SCTE-35, SCTE-130, and/or any other suitable SCTE standards.

Storage facility 208 may be configured to maintain media content data 210 representative of one or more media content streams and/or media content instances and advertisement break data 212 representative of and/or associated with one or more advertisement breaks. It will be recognized that storage facility 208 may maintain additional or alternative data as may serve a particular implementation.

Figure 3:
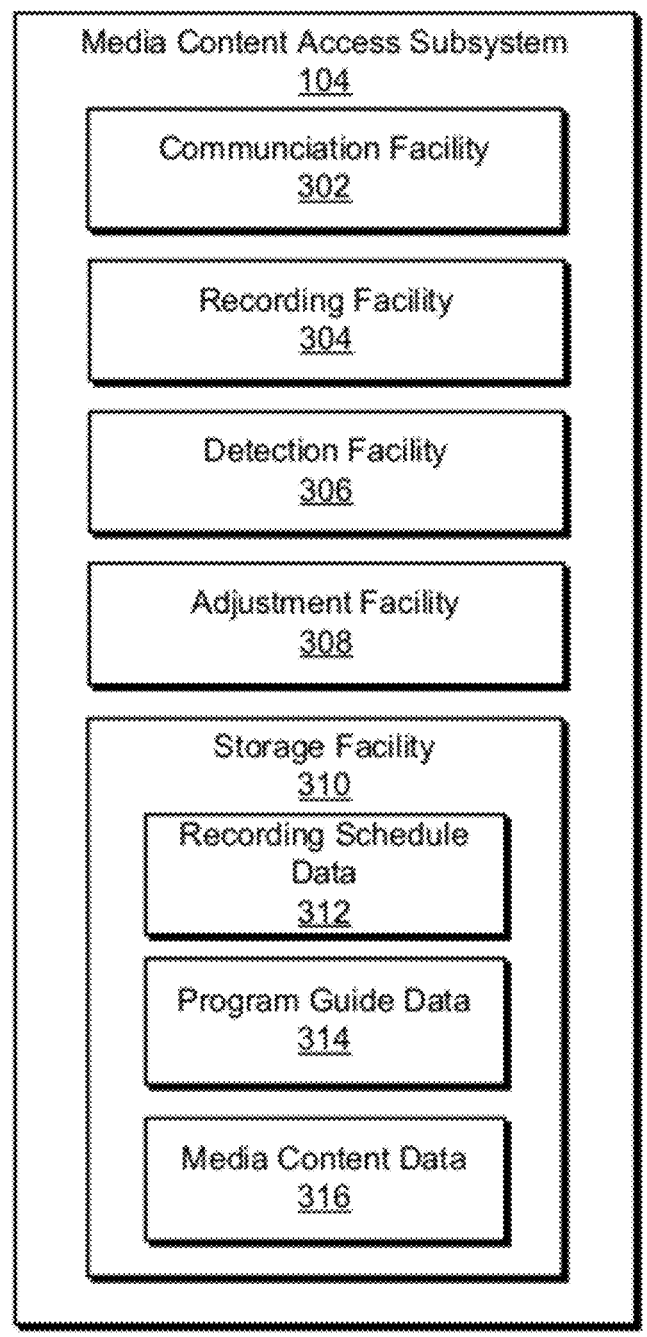
FIG. 3 illustrates exemplary components of a media content access subsystem according to principles described herein.

FIG. 3 illustrates exemplary components of access subsystem 104. As shown in FIG. 3, access subsystem 104 may include a communication facility 302, a recording facility 304, a detection facility 306, an adjustment facility 308, and a storage facility 310, which may be in communication with one another using any suitable communication technologies. It will be recognized that although facilities 302-310 are shown to be separate facilities in FIG. 3, any of those facilities may be combined into a single facility as may serve a particular implementation.

Communication facility 302 may be configured to facilitate communication between access subsystem 104 and delivery subsystem 102. In particular, communication facility 302 may be configured to transmit and/or receive communication signals, media content streams, media content instances, metadata and/or any other data to/from delivery subsystem 102. For example, communication facility 302 may receive data representative of a media content stream comprising one or more media content instances from delivery subsystem 102. Communication facility 302 may be configured to interface with any suitable communication media, protocols, and formats, including any of those mentioned above.

Recording facility 304 may be configured to manage (e.g., maintain, generate, and/or control) a recording schedule. For example, recording facility 304 may be configured to maintain a schedule of one or more recordings (e.g., one or more recordings scheduled by a user of access subsystem 104). In some examples, the recordings schedule may correspond to a live transmission schedule (e.g., the schedule may identify one or more television programs to be recorded that will be transmitted to access subsystem 104 in accordance with a live transmission schedule). In certain embodiments, the recording schedule may specify a start time and a stop time based on a clock reference for each scheduled recording. For example, the start time may specify a specific hour (e.g., 1:00 pm) or half-hour (e.g., 1:30 pm) to start a recording and the stop time may specify a specific hour (e.g., 2:00 pm) or half-hour (e.g., 2:30 pm) to stop the recording. Recording facility 304 may then refer to a clock reference to determine when to start and stop the recording in accordance with the scheduled start time and scheduled stop time. In some examples, the clock reference may include an internal clock (e.g., maintained by access subsystem 104) or an external clock (e.g., maintained by an external device or system and accessed by access subsystem 104).

Recording facility 304 may be further configured to control one or more recording operations of access subsystem 104. For example, recording facility 304 may be configured to trigger a start and a stop of a recording of a media content instance (e.g., a television program) in accordance with a scheduled recording (e.g., by triggering a start of the recording at a scheduled start time and a stop of the recording at a scheduled stop time). In some examples, recording facility 304 may be configured to capture, in real time, a live transmission (e.g., a live broadcast, multicast, or narrowcast) of the media content instance for later play back. Recording facility 304 may be configured to control any other suitable recording operations in any suitable manner.

Detection facility 306 may be configured to detect data representative of an instruction configured to trigger a recording of a media content instance (e.g., trigger a start and/or a stop of a recording of a media content instance accessible by way of delivery subsystem 102). As used herein, the term "instruction" refers to any data, software applications, triggers, operations, and/or processes utilized by access subsystem 104 to record a media content instance. For example, the instruction may include data maintained by recording facility 304, one or more steps performed by recording facility 304 in accordance with a DVR application, one or more triggers utilized by recording facility 304, one or more processes performed by recording facility 304, and/or any other suitable instruction maintained or utilized by recording facility 304 to record a media content instance. Accordingly, detection facility 306 may be configured to detect the instruction to determine that a media content instance will be recorded.

In some examples, detection facility 306 may be configured to detect the instruction within a recording schedule maintained by recording facility 304. In some examples, the recording schedule may utilize and/or link to data available by way of a program guide to trigger the start and/or the stop of the recording of the media content instance. The recording schedule and/or the program guide may include data representative of a scheduled start time of the media content instance, a duration of the media content instance, a scheduled stop time of the media content instance, an identification number of the media content instance, a title of the media content instance, a channel through which the media content instance will be available, a description of the media content instance, and/or any other suitable data that can be used by recording facility 304 to record the media content instance.

Detection facility 306 may be further configured to detect an advertisement break proximate in time to a scheduled start time or a scheduled stop time of a recording. Detection facility 306 may be configured to detect the advertisement break in any suitable manner as may serve a particular implementation. For example, prior to or during the transmission of a media content instance (e.g., a television program) that is scheduled to be recorded, detection facility 306 may be configured to detect a message indicative of an upcoming advertisement break in a media content stream carrying the media content instance. In some examples, the message may be embedded within the media content stream by advertisement break management facility 206 of delivery subsystem 102. Detection facility 306 may be configured to process the data included in the message in order to determine one or more times associated with the advertisement break (e.g., to determine a time of a beginning of the advertisement break, a time of an ending of the advertisement break, and/or a duration of the advertisement break) and/or any other suitable information associated with the advertisement break (e.g., a type of advertisement to be included in the advertisement break). This information may then be used (e.g., by adjustment facility 308) to dynamically adjust a start and/or a stop of the recording of the media content instance, as will be explained in more detail below.

Detection facility 306 may be configured to detect and/or determine that a message indicative of an advertisement break is proximate in time to a start time or a stop time of a recording. For example, detection facility 306 may be configured to detect that the message indicative of the advertisement break is received and/or that at least part of the advertisement break will occur during a predetermined time period associated with the start time or the stop time. The predetermined time period associated with the start time or the stop time may be configured in any suitable manner. For example, the predetermined time period may be configured so that it has a high probability of including the beginning or ending of the recorded media content instance even if the media content instance begins or ends late or early. For example, the predetermined time period may be configured to begin a predetermined number of minutes (e.g., a few minutes) before the start time or the stop time and end a predetermined number of minutes (e.g., a few minutes) after the start time or the stop time. Additionally or alternatively, the predetermined time period may begin or end concurrently with the start time or the stop time. In some examples, a predetermined time period associated with a start time may be configured differently than a predetermined time period associated with a stop time. In certain embodiments, a predetermined time period may be configured to continue indefinitely until detection facility 306 detects a subsequent advertisement break Detection facility 306 may also be configured to determine when a beginning and/or an ending of an advertisement break will occur relative to a start time or a stop time of a recording. For example, detection facility 306 may be configured to detect that an advertisement break will begin and end before a start time or a stop time, that the advertisement break will begin before and end after a start time or a stop time, or that the advertisement break will begin and end after a start time or a stop time. The information detected by detection facility 306 may be utilized to selectively and dynamically adjust a start and/or a stop of a recording of a media content instance, as will be explained in more detail below.

Adjustment facility 308 may be configured to adjust a start and/or a stop of a recording of a media content instance based on one or more advertisement breaks. For example, adjustment facility 308 may be configured to dynamically adjust a start or a stop of a recording of a television program to correspond with an advertisement break (e.g., an advertisement break occurring proximate in time to the scheduled start time or stop time of the television program). Because many television programs begin after a preceding advertisement break and/or end before a subsequent advertisement break, adjusting the start and/or stop of the recording based on one or more advertisement breaks may insure that a beginning and/or an ending of the television program is captured in the recording even if the television program begins early (e.g., earlier than the scheduled start time) and/or ends late (e.g., later than the scheduled stop time). Additionally or alternatively, adjusting the start and/or the stop of the recording based on the one or more advertisement breaks may prevent the recording from including media content (e.g., advertisements) received before the beginning of the television program (e.g., if the television program begins late) or received after the ending of the television program (e.g., if the television program ends early).

Adjustment facility 308 may be configured to adjust the start and/or the stop of the recording in any suitable manner. For example, in response to a detection by detection facility 306 of an advertisement break proximate in time to a scheduled start time of a recording, adjustment facility 308 may be configured to adjust a start of the recording to coincide with (e.g., to occur concurrently with) the beginning of the advertisement break (e.g., to capture the advertisements delivered during the advertisement break in the recording) or to coincide with an ending of the advertisement break (e.g., to exclude the advertisements from the recording). Similarly, in response to a detection of an advertisement break proximate in time to the scheduled stop time of a recording, adjustment facility 308 may be configured to adjust a stop of the recording to coincide with the beginning of the advertisement break (e.g., to exclude the corresponding advertisements from the recording) or to coincide with an ending of the advertisement break (e.g., to capture the corresponding advertisements in the recording).

In some examples, adjusting a start and/or a stop of a recording of a media content instance may include adjusting the start time and/or the stop time associated with a corresponding instruction. For example, adjustment facility 308 may be configured to adjust (e.g., move backward or forward in time) a scheduled start time and/or a scheduled stop time to coincide with a beginning or an ending of a detected advertisement break. The adjusted start time or stop time may then be used to trigger the start or the stop of the recording concurrently with the beginning and/or ending of the advertisement break. In additional or alternative examples, adjusting the start and/or stop of the recording based on the advertisement break may include overriding an instruction configured to trigger a start or a stop of a recording and triggering the start or stop of the recording based on the advertisement break. For example, adjustment facility 308 may be configured to override a scheduled start time of a scheduled recording and trigger the start of the recording based on an advertisement break (e.g., to coincide with a beginning or an ending of the advertisement break) and/or override a scheduled stop time of a scheduled recording and trigger the stop of the recording based on an additional advertisement break (e.g., to coincide with a beginning or an ending of the additional advertisement break).

In some examples, adjustment facility 308 may be configured to selectively disregard detected advertisement breaks, despite being proximate in time to a scheduled start time or a scheduled stop time. For example, adjustment facility 308 may be configured to selectively disregard one or more advertisement breaks in accordance with one or more predetermined adjustment heuristics. For example, a particular adjustment heuristic may specify one or more conditions that govern whether or not adjustment facility 308 disregards a detected advertisement break or utilizes the detected advertisement break to adjust a start or a stop of a recording. An adjustment heuristic may specify one or more conditions associated with when an advertisement break will begin, when an advertisement break will end, when an advertisement break is detected, a proximity of the advertisement break to a scheduled start/stop time, whether the scheduled start/stop time will occur during the advertisement break, a duration of the advertisement break, and/or any other suitable information associated with the advertisement break and/or the corresponding start/stop time.

To illustrate, in some examples, if detection facility 306 detects an advertisement break that will begin after a scheduled start time of a recording, adjustment facility 308 may choose not to adjust a start of the recording based on the advertisement break because a portion of the media content instance to be recorded may be presented prior to the advertisement break (e.g., a beginning of the media content instance may be presented between the scheduled start time and the beginning of the advertisement break). Similarly, if detection facility 306 detects an advertisement break that will end prior to a scheduled stop time of a recording, adjustment facility 308 may choose not to adjust a stop of the recording based on the advertisement break because a portion of the media content instance being recorded (e.g., an ending of the media content instance) may be presented after the advertisement break (e.g., between the ending of the advertisement break and the scheduled stop time). In additional or alternative examples, adjustment facility 308 may be configured to selectively disregard one or more advertisement breaks for any other suitable reason and/or in any other suitable manner.

Storage facility 310 may be configured to maintain recording schedule data 312 representative of one or more scheduled recordings, program guide data 314 representative of data available by way of a program guide (e.g., data indicating a media content transmission schedule and lineup), and media content data 316 representative of one or more media content streams or media content instances. It will be recognized that storage facility 310 may maintain additional or alternative data as may serve a particular implementation.

Figure 4:
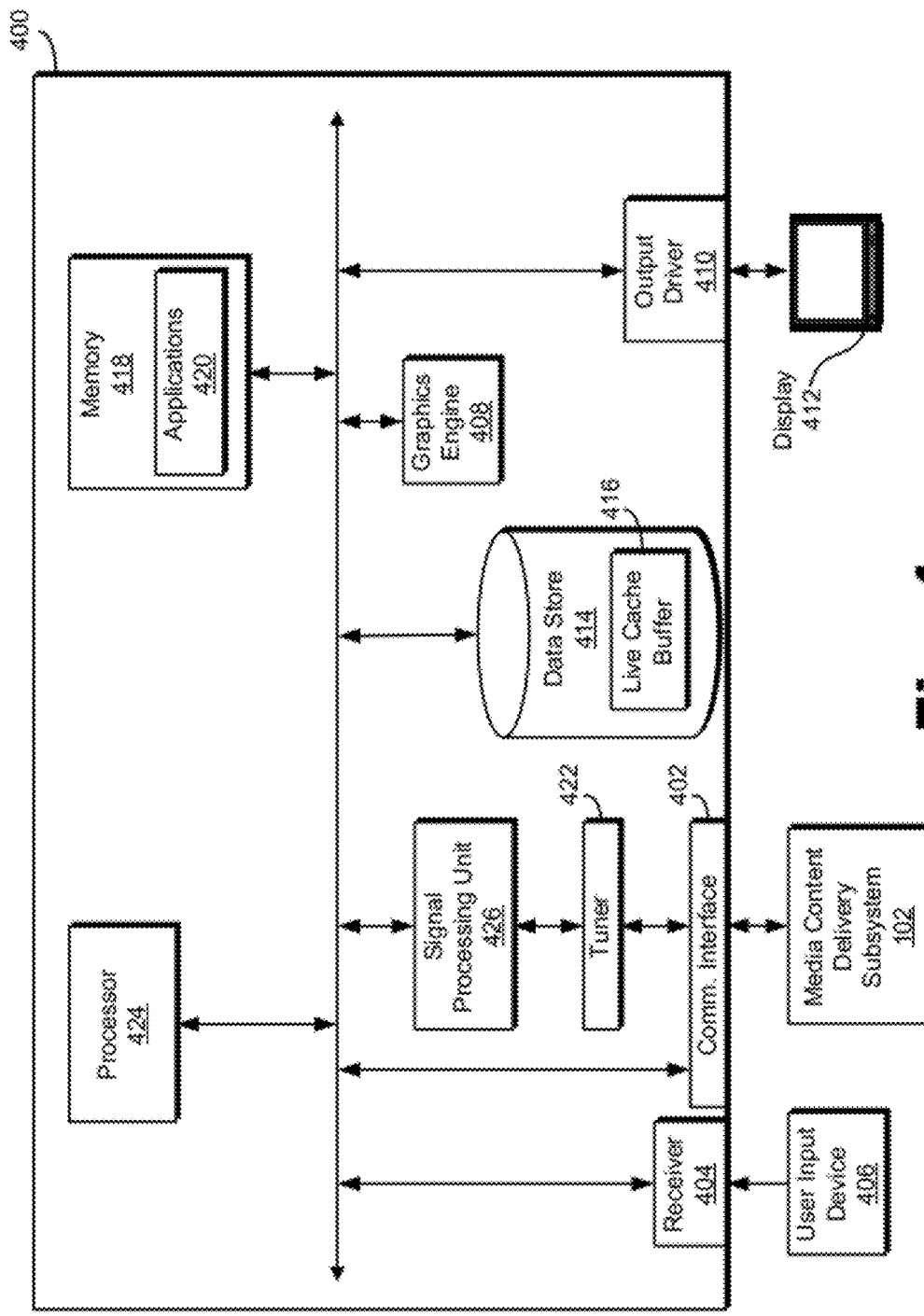
FIG. 4 illustrates an exemplary media content access device having the media content access subsystem of FIG. 3 implemented thereon according to principles described herein.

Access subsystem 104 and/or one or more components of access subsystem 104 may be implemented as may suit a particular implementation. FIG. 4 illustrates an exemplary media content access device 400 (or simply "device 400") having access subsystem 104 implemented thereon. Device 400 may include one or more of the components of access subsystem 104 shown in FIG. 3 and may be configured to perform one or more of the processes and/or operations described herein. Device 400 may include, but is not limited to, a set-top box device, a digital video recorder ("DVR") device, a multi-room DVR device, a media content processing device, a communications device, a mobile device (e.g., a mobile phone device), a handheld device, a personal computer, a phone device, a personal-digital assistant device, a gaming device, a television device, and/or any device configured to perform one or more of the processes and/or operations described herein.

As shown in FIG. 4, device 400 may include a communication interface 402 configured to receive media content and/or data (e.g., metadata, program guide data, and/or any other data associated with media content) in any acceptable format from delivery subsystem 102 or from any other suitable external source. Communication interface 402 may include any device, logic, and/or other technologies suitable for receiving signals and/or data representative of media content and/or other types of media content or data. Communication interface 402 may be configured to interface with any suitable communication media, protocols, and formats, including any of those mentioned above.

Device 400 may include a receiver 404 configured to receive user input signals from a user input device 406. User input device 406 may include, for example, a remote control device or any other suitable input device and may be configured to communicate with receiver 404 via a wireless link, electrical connection, or any other suitable communication link.

Device 400 may include a graphics engine 408 and an output driver 410. Graphics engine 408 may be configured to generate graphics to be provided to output driver 410, which may be configured to interface with or drive a display 412. Output driver 410 may provide output signals to display 412, the output signals including graphical media content (e.g., media content and/or program guide media content) generated by graphics engine 408 and to be presented by display 412 for experiencing by a user. For example, output driver 410 may provide data representative of a graphical user interface ("GUI") including a program guide view, a media playback view, or a permanent recording listing view to display 412 for presentation to the user. Graphics engine 408 and output driver 410 may include any combination of hardware, software, and/or firmware as may serve a particular implementation.

Data store 414 may include one or more data storage media, devices, or configurations and may employ any type, form, and combination of storage media. For example, data store 414 may include, but is not limited to, a hard drive, network drive, flash drive, magnetic disc, optical disc, or other non-volatile storage unit. Media content and/or data associated with media content may be temporarily and/or permanently stored in data store 414.

Data store 414 is shown to be included within device 400 in FIG. 4 for illustrative purposes only. It will be understood that data store 414 may additionally or alternatively be located external to device 400.

Data store 414 may include one or more live cache buffers 416 (or simply "buffers 416"). Live cache buffer 416 may additionally or alternatively reside in memory 418 or in a storage device external to device 400. In some examples, media content stream data may be temporarily stored in live cache buffer 416 to facilitate playback of media content, pausing of playback of media content, time-shifted playback of media content, recording of media content, and/or presentation of media content in one or more trick play modes.

Device 400 may include memory 418. Memory 418 may include, but is not limited to, FLASH memory, random access memory ("RAM"), dynamic RAM ("DRAM"), other suitable computer-readable media, or any combination or sub-combination thereof. In some examples, one or more applications 420 configured to run on or otherwise be executed by device 400 may reside in memory 418.

Device 400 may include one or more tuners 422. Tuner 422 may be configured to selectively receive media content carried on a particular media content carrier channel such that the media content may be processed by device 400. In some examples, media content received by tuner 422 may be temporarily buffered, or stored, in buffer 416. If there are multiple tuners 422, there may be a buffer 416 corresponding to each of the tuners 422.

While tuner 422 may be used to receive certain media content-carrying signals transmitted by provider subsystem 102, device 400 may be configured to receive other types of media content signals (including media content signals and/or program guide data signals) from provider subsystem 102 and/or one or more other sources without using a tuner. For example, provider subsystem 102 may transmit digital streams of data packets (e.g., Internet Protocol ("IP") based data packets) that can be received without using a tuner. For such types of media content signals, communication interface 402 may receive and forward the signals directly to other components of device 400 (e.g., buffer 416, processor 424, and/or signal processing unit 426) without the signals going through tuner 422. For an IP-based signal, for example, signal processing unit 426 may function as an IP receiver.

Device 400 may include at least one processor, such as processor 424, configured to control and/or perform one or more operations of device 400. Device 400 may also include a signal processing unit 426 configured to process incoming media content. Signal processing unit 426 may be configured, for example, to demodulate and parse encoded digital media content. In some examples, device 400 may include one or more signal processing units 426 corresponding to each of the tuners 422.

Although FIG. 4 illustrates access subsystem 104 implemented by a user device (e.g., device 400), in additional or alternative examples, access subsystem 104 and/or one or more components of access subsystem 104 may be implemented within a network and/or by one or more network devices. For example, one or more components of access subsystem 104 may be implemented on one or more network DVR devices or in any other suitable manner.

Figure 5:
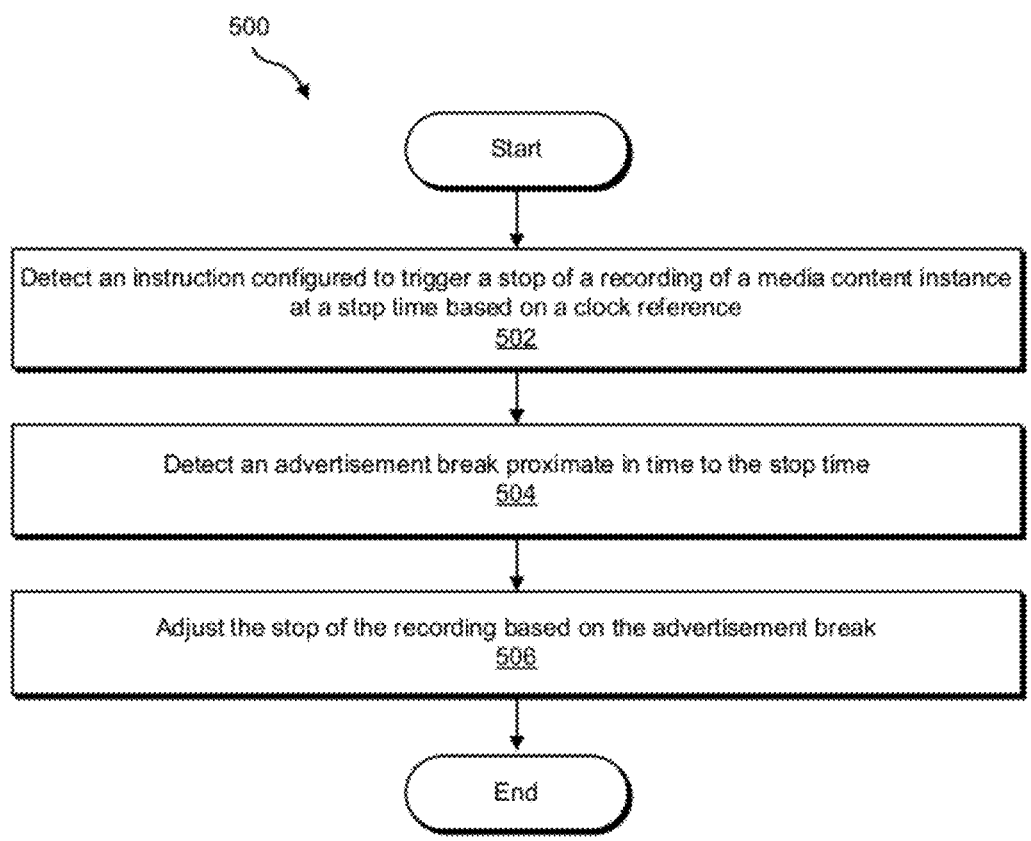
FIG. 5 illustrates an exemplary method of dynamically adjusting a stop of a recording based on an advertisement break according to principles described herein.

FIG. 5 illustrates an exemplary method 500 of dynamically adjusting a stop of a recording based on an advertisement break. While FIG. 5 illustrates exemplary steps according to one embodiment, other embodiments may omit, add to, reorder, and/or modify any of the steps shown in FIG. 5. The steps shown in FIG. 5 may be performed by any component or combination of components of access subsystem 104.

In step 502, a media content access subsystem detects an instruction configured to trigger a stop of a recording of a media content instance at a stop time based on a clock reference. For example, detection facility 306 may be configured to detect the instruction in any of the ways described herein.

In step 504, the media content access subsystem detects an advertisement break proximate in time to the stop time. For example, detection facility 306 may be configured to detect the advertisement break proximate in time to the stop time in any suitable manner.

Figure 6:
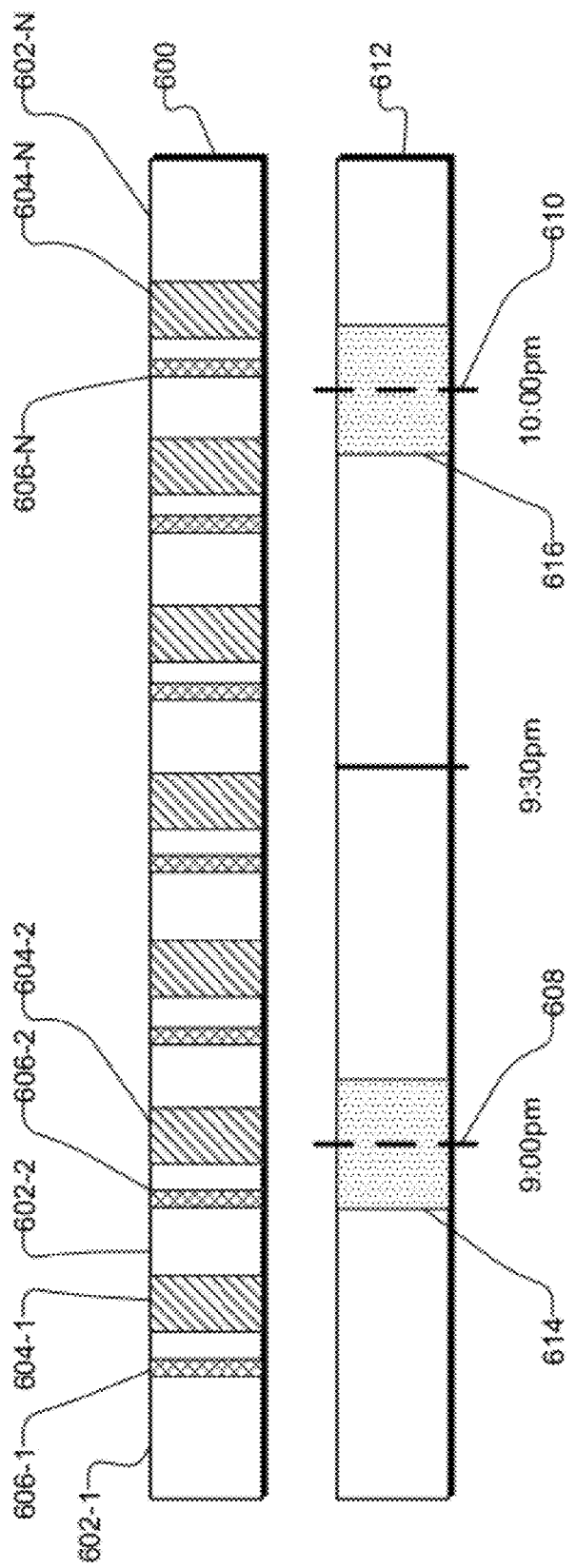
FIG. 6 shows an exemplary media content stream including a media content instance scheduled to be recorded according to principles described herein.

To illustrate, FIG. 6 shows an exemplary media content stream 600 that may be transmitted by delivery subsystem 102 to an access device (e.g., device 400). As shown in FIG. 6, media content stream 600 may include media content segments 602 (e.g., media content segments 602-1 through 602-N) representative of one or more media content instances. For example, one or more of media content segments 602 may represent a television program carried by media content stream 600. Media content stream 600 may also include a plurality of advertisement breaks 604 (e.g., advertisement breaks 604-1 through 604-N) interspersed therein. One or more advertisements may be presented to viewers of segments 602 during advertisement breaks 604. Each advertisement break 604 may be of any suitable duration as may serve a particular implementation.

Media content delivery subsystem 102 may insert messages 606 (e.g., messages 606-1 through 606-N) into media content stream 600 in order to notify access subsystem 104 of advertisement breaks 604. Messages 606 may be configured to provide information about advertisement breaks 604 such as, but not limited to, the times that advertisement breaks 604 will begin and/or end, the lengths of time of advertisement breaks 604, and/or any other information as may serve a particular implementation. Messages 606 may precede advertisement breaks 604 within media content stream 600 by any suitable amount of time (e.g., a few seconds).

In some examples, recording facility 304 may be configured to record a media content instance within media content stream 600 in accordance with one or more instructions configured to trigger a recording of the media content instance. For example, as shown in FIG. 6, the one or more instructions may be configured to trigger a start of the recording at a start time 608 and a stop of the recording at a stop time 610 based on a clock reference 612. As shown, start time 608 may correspond to a time of 9:00 pm based on clock reference 612 and stop time 610 may correspond to a time of 10:00 pm based on clock reference 612. In some examples, start time 608 and stop time 610 may be specified by a recording schedule (e.g., a DVR application may schedule start time 608 and/or stop time 610 to record a desired television program to be transmitted between 9:00 pm and 10:00 pm.

Additionally or alternatively, a first predetermined time period 614 may be associated with start time 608 (e.g., time period 614 may begin a predetermined amount of time before start time 608 and end a predetermined amount of time after start time 608) and a second predetermined time period 616 may be associated with stop time 610 (e.g., time period 616 may begin a predetermined amount of time before stop time 610 and end a predetermined amount of time after stop time 610). In some examples, predetermined time periods 614 and 616 may be based on automatic settings or may be based on user-configurable parameters. Once set, predetermined time periods 614 and 616 may be utilized by detection facility 306 to detect one or more of advertisement breaks 604 that are proximate in time to start time 608 and stop time 610. To illustrate, detection facility 306 may be configured to detect message 606-N and, based on message 606-N, determine that advertisement break 604-N will occur proximate in time to stop time 610. Additionally or alternatively, detection facility 306 may be configured to determine, based on message 606-N, when advertisement break 606-N will begin and/or end. In some examples, detection facility 306 may selectively monitor media content stream 600 in accordance with predetermined time periods 614 and 616. For example, predetermined time periods 614 and 616 may trigger when detection facility 306 monitors media content stream for messages 606 (e.g., such that detection facility 306 only monitors media content stream 600 for messages 606 during predetermined time periods 614 and 616. Detection facility 306 may be configured to monitor media content stream 600 and detect one or more of messages 606 in any other suitable manner. In additional or alternative examples, detection facility 306 may be configured to continuously monitor media content stream 600 and detect messages 606. Upon detecting each of messages 606, detection facility 306 may then determine whether the detected message or the corresponding advertisement break is or will be received during one of time periods 614 and 616. For example, detection facility 306 may detect message 606-N and determine that message 606-N or at least part of the corresponding advertisement break (e.g., advertisement break 604-N) is received during time period 616.

Returning to FIG. 5, in step 506, the media content access subsystem adjusts the stop of the recording based on the advertisement break. Adjustment facility 308 may be configured to adjust the stop of the recording in any suitable manner, such as described herein. To illustrate, and referring again to FIG. 6, adjustment facility 308 may be configured to adjust the stop of the recording of a media content instance carried by media content stream 600 to coincide with the beginning or the ending of advertisement break 604-N. For example, adjustment facility 308 may adjust stop time 610 to coincide with the beginning or the ending of advertisement break 604-N. Alternatively, adjustment facility 308 may be configured to override an instruction configured to trigger the stop of the recording at stop time 610 and trigger the stop of the recording at the beginning or the ending of advertisement break 604-N. Accordingly, the recording will capture the entire media content segment preceding advertisement break 604-N, which segment may include an ending of the corresponding media content instance.

FIG. 6 is provided for illustrative purposes only and is not limiting. In additional or alternative examples, a media content stream may include additional elements and/or may exclude certain illustrated elements, as may serve a particular implementation.

Figure 7:
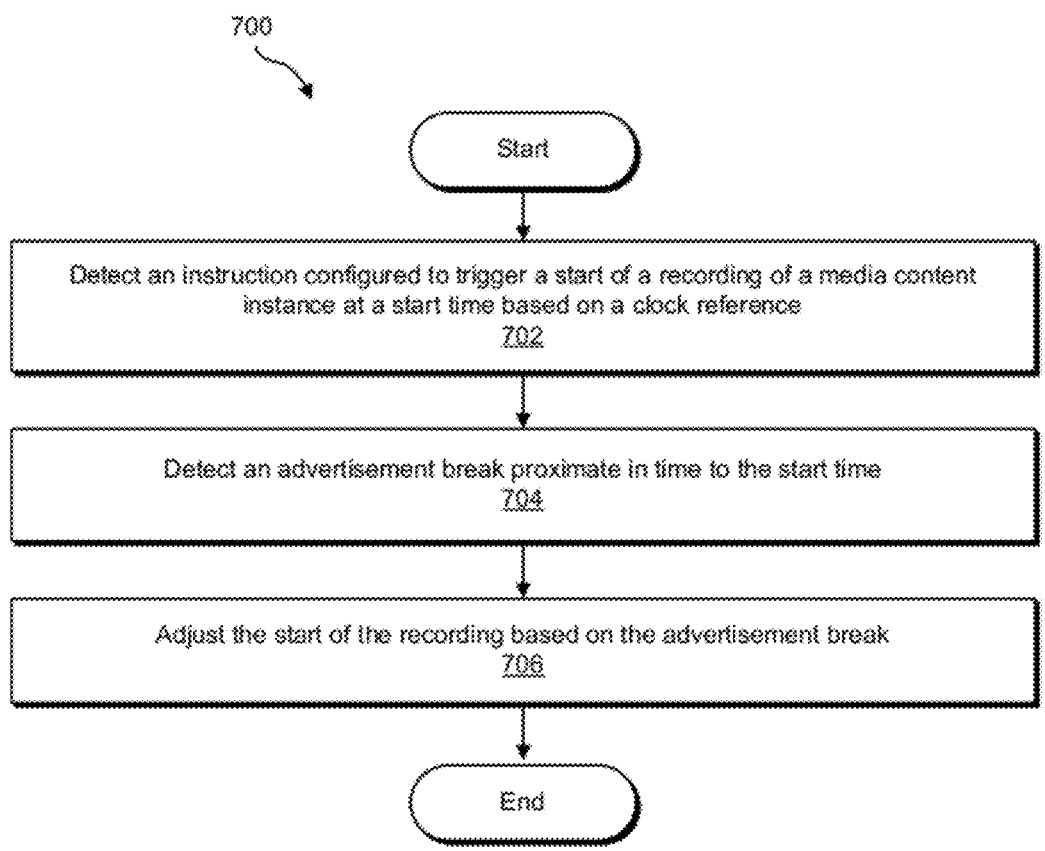
FIG. 7 illustrates an exemplary method of dynamically adjusting a start of a recording based on an advertisement break according to principles described herein.

FIG. 7 illustrates an exemplary method 700 of dynamically adjusting a start of a recording based on an advertisement break. While FIG. 7 illustrates exemplary steps according to one embodiment, other embodiments may omit, add to, reorder, and/or modify any of the steps shown in FIG. 7. The steps shown in FIG. 7 may be performed by any component or combination of components of access subsystem 104.

In step 702, a media content access subsystem detects an instruction configured to trigger a start of a recording of a media content instance at a start time based on a clock reference. For example, detection facility 306 may be configured to detect the instruction in any of the ways described herein.

In step 704, the media content access subsystem detects an advertisement break proximate in time to the start time. For example, detection facility 306 may be configured to detect the advertisement break proximate in time to the start time in any of the ways described herein. To illustrate, and referring again to FIG. 6, detection facility 306 may be configured to detect message 606-2 during time period 614 and determine that advertisement break 604-2 will occur proximate in time to start time 608. In some examples, detection facility 306 may be configured to determine, based on message 606-2, when advertisement break 606-2 will begin and/or end.

In step 706, the media content access subsystem adjusts the start of the recording based on the advertisement break. Adjustment facility 308 may be configured to adjust the start of the recording in any suitable manner, such as described herein. To illustrate, adjustment facility 308 may be configured to adjust the start of the recording based on advertisement break 604-2 (e.g., to coincide with a beginning or an ending of advertisement break 604-2).

Figure 8:
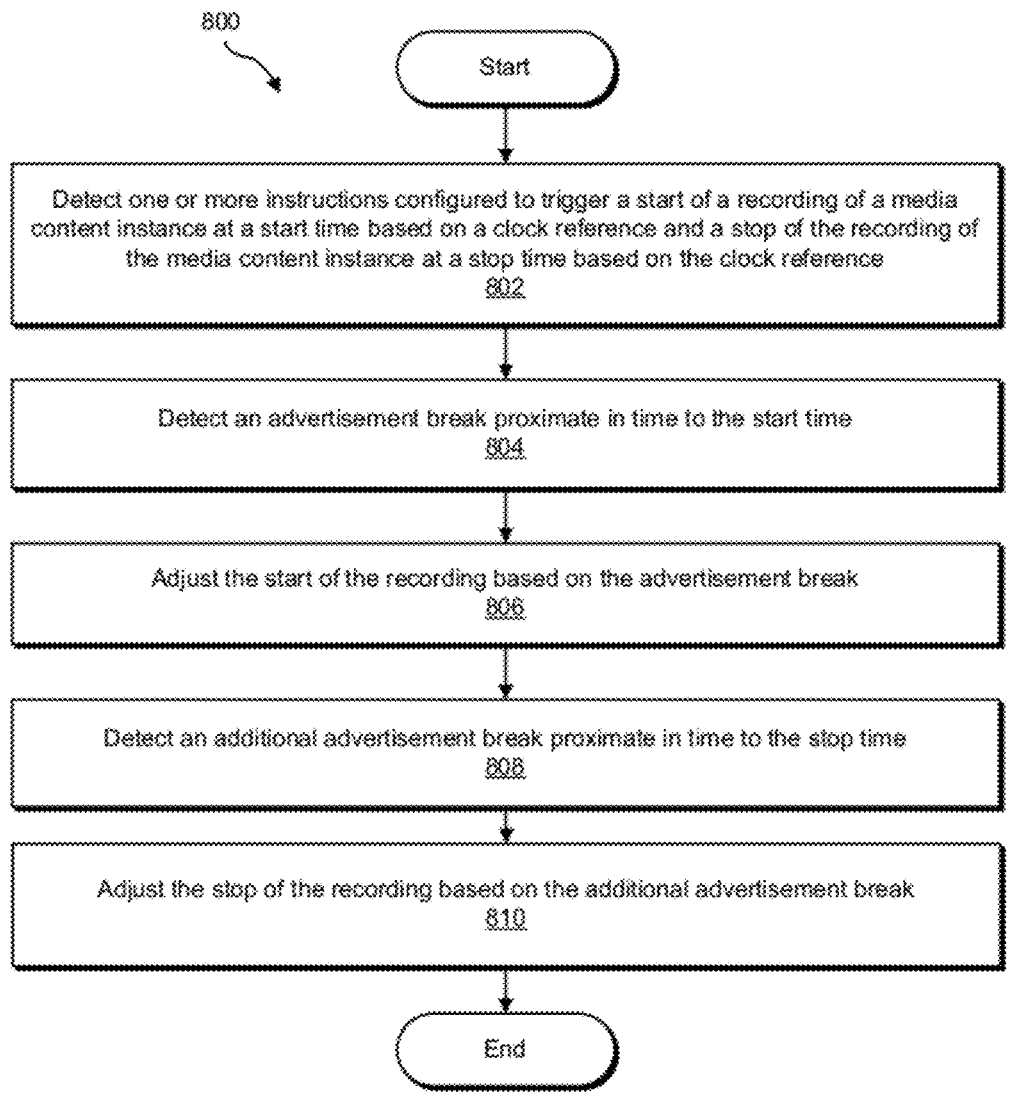
FIG. 8 illustrates an exemplary method of dynamically adjusting a start and a stop of a recording based on one or more advertisement breaks according to principles described herein.

FIG. 8 illustrates an exemplary method 800 of dynamically adjusting a start and a stop of a recording based on one or more advertisement breaks. While FIG. 8 illustrates exemplary steps according to one embodiment, other embodiments may omit, add to, reorder, and/or modify any of the steps shown in FIG. 8. The steps shown in FIG. 8 may be performed by any component or combination of components of access subsystem 104.

In step 802, a media content access subsystem detects one or more instructions configured to trigger a start of a recording of a media content instance at a start time based on a clock reference and a stop of the recording of the media content instance at a stop time based on the clock reference. For example, detection facility 306 may be configured to detect the one or more instructions in any of the ways described herein.

In step 804, the media content access subsystem detects an advertisement break proximate in time to the start time. For example, detection facility 306 may be configured to detect the advertisement break proximate in time to the start time in any of the ways described herein.

In step 806, the media content access subsystem adjusts the start of the recording based on the advertisement break. For example, adjustment facility 308 may be configured to adjust the start of the recording based on the advertisement break in any of the ways described herein.

In step 808, the media content access subsystem detects an additional advertisement break proximate in time to the stop time. For example, adjustment facility 308 may be configured to detect the additional advertisement break in any of the ways described herein.

In step 810, the media content access subsystem adjusts the stop of the recording based on the additional advertisement break. For example, adjustment facility 308 may be configured to adjust the stop of the recording based on the additional advertisement break in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 9:
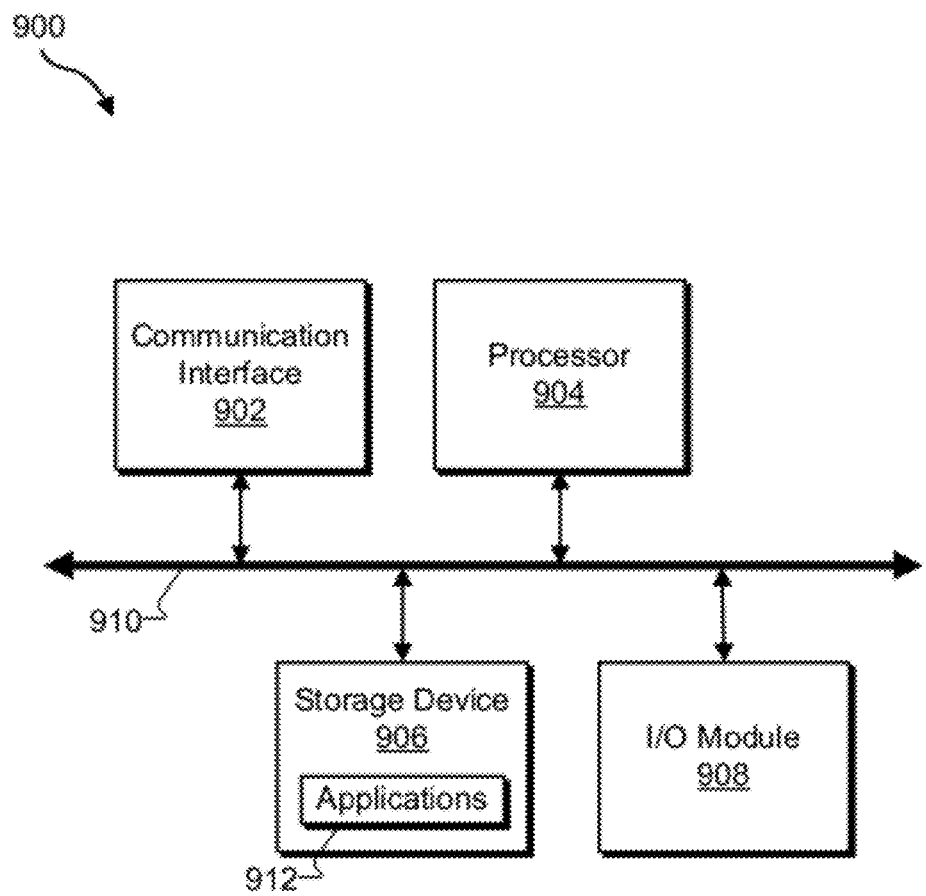
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, and any other suitable interface. In at least one embodiment, communication interface 902 may provide a direct connection between system 100 and one or more provisioning systems via a direct link to a network, such as the Internet. Communication interface 902 may additionally or alternatively provide such a connection through, for example, a local area network (such as an Ethernet network), a personal area network, a telephone or cable network, a satellite data connection, a dedicated URL, or any other suitable connection. Communication interface 902 may be configured to interface with any suitable communication media, protocols, and formats, including any of those mentioned above.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 (which may include, but are not limited to, one or more of the software applications described herein) configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with media content facility 202, communication facility 204, advertisement break management facility 206, communication facility 302, detection facility 306, and/or adjustment facility 308. Likewise, storage facilities 208 and/or 310 may be implemented by or within storage device 906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
  detecting, by a media content access subsystem, data representative of an instruction configured to trigger a stop of a recording of a media content instance at a scheduled recording stop time based on a clock reference, the scheduled recording stop time coinciding with a scheduled ending of the media content instance;
  detecting, by the media content access subsystem, a message indicative of an advertisement break proximate in time to the scheduled recording stop time coinciding with the scheduled ending of the media content instance;
  determining, by the media content access subsystem based on the message, when a beginning and an ending of the advertisement break will occur relative to the scheduled recording stop time coinciding with the scheduled ending of the media content instance; and
  selectively adjusting, by the media content access subsystem based on when the beginning and the ending of the advertisement break will occur relative to the scheduled recording stop time coinciding with the scheduled ending of the media content instance, the scheduled recording stop time based on the clock reference to coincide with the beginning or the ending of the advertisement break rather than with the scheduled ending of the media content instance.

2. The method of claim 1, wherein the determining when the beginning and the ending of the advertisement break will occur relative to the scheduled recording stop time coinciding with the scheduled ending of the media content instance comprises determining that the beginning and the ending of the advertisement break will occur after the scheduled recording stop time coinciding with the scheduled ending of the media content instance.

3. The method of claim 1, wherein the determining when the beginning and the ending of the advertisement break will occur relative to the scheduled recording stop time coinciding with the scheduled ending of the media content instance comprises determining that the beginning of the advertisement break will occur before the scheduled recording stop time coinciding with the scheduled ending of the media content instance and that the ending of the advertisement break will occur after the scheduled recording stop time coinciding with the scheduled ending of the media content instance.

4. The method of claim 1, wherein the detecting the message indicative of the advertisement break proximate in time to the scheduled recording stop time comprises:
  monitoring a data stream associated with the media content instance for the message indicative of the advertisement break.

5. The method of claim 4, wherein the message indicative of the advertisement break comprises a cue message configured to signal that the advertisement break is forthcoming.

6. The method of claim 4, wherein detecting the message indicative of the advertisement break comprises detecting the message during a predetermined time period which begins a predetermined amount of time before the scheduled recording stop time and ends a predetermined amount of time after the scheduled recording stop time based on the clock reference.

7. The method of claim 1, embodied as computer-executable instructions on at least one non-transitory computer-readable medium.

8. The method of claim 1, further comprising:
  detecting, by the media content access subsystem, an additional message indicative of an additional advertisement break proximate in time to the scheduled recording stop time coinciding with the scheduled ending of the media content instance;
  determining, by the media content access subsystem based on the additional message, when a beginning and an ending of the additional advertisement break will occur relative to the scheduled recording stop time coinciding with the scheduled ending of the media content instance; and selectively not adjusting, by the media content access subsystem based on when the beginning and the ending of the additional advertisement break will occur relative to the scheduled recording stop time coinciding with the scheduled ending of the media content instance, the scheduled recording stop time based on the clock reference to coincide with the beginning or the ending of the additional advertisement break.

9. A method comprising:

detecting, by a media content access subsystem, data representative of an instruction configured to trigger a start of a recording of a media content instance at a start time based on a clock reference;

detecting, by the media content access subsystem, a message indicative of an advertisement break proximate in time to the start time based on the clock reference;

determining, by the media content access subsystem based on the message, when a beginning and an ending of the advertisement break will occur relative to the start time of the recording; and selectively adjusting, by the media content access subsystem based on when the beginning and the ending of the advertisement break will occur relative to the start time of the recording, the start time of the recording based on the clock reference to coincide with the beginning or the ending of the advertisement break.

10. The method of claim 9, wherein the determining when the beginning and the ending of the advertisement break will occur relative to the start time of the recording comprises determining that the beginning and the ending of the advertisement break will occur before the start time of the recording.

11. The method of claim 9, wherein the determining when the beginning and the ending of the advertisement break will occur relative to the start time of the recording comprises determining that the beginning of the advertisement break will occur before the start time of the recording and that the ending of the advertisement break will occur after the start time of the recording.

12. The method of claim 9, wherein the selectively adjusting the start time of the recording to coincide with the beginning or the ending of the advertisement break comprises:
overriding the instruction; and
triggering the start of the recording at the beginning or the ending of the advertisement break.

13. The method of claim 9, wherein the detecting the message indicative of the advertisement break proximate in time to the start time comprises:
monitoring a data stream associated with the media content instance for the message indicative of the advertisement break.

14. The method of claim 9, embodied as computer-executable instructions on at least one non-transitory computer-readable medium.

15. The method of claim 9, further comprising:
detecting, by the media content access subsystem, an additional message indicative of an additional advertisement break proximate in time to the start time of the recording;
determining, by the media content access subsystem based on the additional message, when a beginning and an ending of the additional advertisement break will occur relative to the start time of the recording; and
selectively not adjusting, by the media content access subsystem based on when the beginning and the ending of the additional advertisement break will occur relative to the start time of the recording, the start time of the recording based on the clock reference to coincide with the beginning or the ending of the additional advertisement break.

16. A method comprising:

detecting, by a media content access subsystem, data representative of one or more instructions configured to trigger a start of a recording of a media content instance at a start time based on a clock reference and a stop of the recording of the media content instance at a stop time based on the clock reference;

detecting, by the media content access subsystem, a message indicative of an advertisement break proximate in time to the start time of the recording based on the clock reference;

determining, by the media content access subsystem based on the message indicative of the advertisement break proximate in time to the start time of the recording based on the clock reference, when a beginning and an ending of the advertisement break will occur relative to the start time of the recording;

selectively adjusting, by the media content access subsystem based on when the beginning and the ending of the advertisement break will occur relative to the start time of the recording, the start time of the recording based on the clock reference to coincide with the beginning or the ending of the advertisement break;

detecting, by the media content access subsystem, an additional message indicative of an additional advertisement break proximate in time to the stop time of the recording based on the clock reference;

determining, by the media content access subsystem based on the additional message, when a beginning and an ending of the additional advertisement break will occur relative to the stop time of the recording; and selectively adjusting, by the media content access subsystem based on when the beginning and the ending of the additional advertisement break will occur relative to the stop time of the recording, the stop time of the recording based on the clock reference to coincide with the beginning or the ending of the additional advertisement break.

17. The method of claim 16, wherein:
the detecting the message indicative of the advertisement break comprises detecting a cue message configured to signal that the advertisement break is forthcoming; and
the detecting the additional message indicative of the additional advertisement break comprises detecting an additional cue message configured to signal that the additional advertisement break is forthcoming.

18. The method of claim 16, embodied as computer-executable instructions on at least one non-transitory computer-readable medium.

19. A system comprising:
a detection facility that
detects one or more instructions configured to trigger a start of a recording of a media content instance at a scheduled recording start time based on a clock reference or a stop of the recording of the media content instance at a scheduled recording stop time based on the clock reference, the scheduled recording start time coinciding with a scheduled start of the media content instance and the scheduled recording stop time coinciding with a scheduled ending of the media content instance, and detects a message indicative of an advertisement break proximate in time to the scheduled recording start time based on the clock reference or the scheduled recording stop time based on the clock reference;

determines, based on the message, when a beginning and an ending of the advertisement break will occur relative to either the scheduled recording start time coinciding with the scheduled start of the media content instance or the scheduled recording stop time coinciding with the scheduled ending of the media content instance; and an adjustment facility communicatively coupled to the detection facility and that selectively adjusts, based on when the beginning and the ending of the advertisement break will occur relative to either the scheduled recording start time coinciding with the scheduled start of the media content instance or the scheduled recording stop time coinciding with the scheduled ending of the media content instance, either the scheduled recording start time based on the clock reference to coincide with the beginning or the end of the advertisement break rather than with the scheduled start of the media content instance or the scheduled recording stop time based on the clock reference to coincide with the beginning or the end of the advertisement break rather than with the scheduled ending of the media content instance.

20. The system of claim 19, wherein the detection facility monitors a data stream associated with the media content instance for the message indicative of the advertisement break.

* * * * *